(12) United States Patent
Oklejas, Jr.

(10) Patent No.: US 9,028,700 B2
(45) Date of Patent: May 12, 2015

(54) LIQUID FLOTATION SYSTEM WITH ENERGY RECOVERY DEVICES

(71) Applicant: Fluid Equipment Development Company, LLC, Monroe, MI (US)

(72) Inventor: Eli Oklejas, Jr., Newport, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 152 days.

(21) Appl. No.: 13/892,746

(22) Filed: May 13, 2013

(65) Prior Publication Data

US 2013/0306568 A1 Nov. 21, 2013

Related U.S. Application Data

(60) Provisional application No. 61/646,958, filed on May 15, 2012.

(51) Int. Cl.
| | |
|---|---|
| *B03D 1/14* | (2006.01) |
| *C02F 1/24* | (2006.01) |
| *F04D 31/00* | (2006.01) |
| *B03D 1/02* | (2006.01) |
| *B03D 1/24* | (2006.01) |

(52) U.S. Cl.
CPC ... *C02F 1/24* (2013.01); *B03D 1/02* (2013.01); *B03D 1/1431* (2013.01); *B03D 1/1456* (2013.01); *B03D 1/247* (2013.01)

(58) Field of Classification Search
None
See application file for complete search history.

(56) References Cited

U.S. PATENT DOCUMENTS

| | | | |
|---|---|---|---|
| 1,894,393 | A | 1/1933 | Bigelow |
| 2,742,424 | A | 4/1956 | Saddington et al. |
| 3,501,000 | A | 3/1970 | Roberts, Jr. |
| 5,525,238 | A | 6/1996 | Menke |
| 6,074,554 | A * | 6/2000 | Ray et al. ............... 210/221.2 |
| 2008/0083997 | A1* | 4/2008 | Wu et al. ............... 261/93 |
| 2009/0023816 | A1 | 1/2009 | Lefevre et al. |

FOREIGN PATENT DOCUMENTS

| | | |
|---|---|---|
| DE | 563471 | 11/1932 |
| DE | 94 04 988.2 | 8/1994 |
| DE | 43 15 234 | 11/1994 |
| FR | 714237 | 11/1931 |
| GB | 408468 | 4/1934 |
| WO | WO2011/038452 | 4/2011 |

* cited by examiner

*Primary Examiner* — Thomas M Lithgow
(74) *Attorney, Agent, or Firm* — Harness, Dickey & Pierce

(57) ABSTRACT

A system and method of operating the same includes an absorption tank having a compressor communicating gas thereto, a suspended solid filtration tank having a primary inlet, a secondary inlet, a primary outlet and a secondary outlet and a pump comprising a pump inlet coupled to the secondary outlet and a pump outlet communicating fluid to the absorption tank. The absorption tank forms a solution from the fluid and gas. A turbine mechanically couples the pump with a common shaft extending to the pump. The turbine has a turbine inlet coupled to the absorption tank and a turbine outlet coupled to the secondary inlet. The turbine depressurizes the solution. The system may also use a centrifugal pump in place of a turbine and absorption tank.

13 Claims, 7 Drawing Sheets

LIQUID FLOTATION SYSTEM WITH ENERGY RECOVERY DEVICES

CROSS-REFERENCE TO RELATED APPLICATIONS

This application claims the benefit of U.S. Provisional Application No. 61/646,958, filed on May 15, 2012. The entire disclosure of the above application is incorporated herein by reference.

FIELD

The present disclosure relates to a suspended solids flotation system, and, more specifically, to a suspended gas filtration system such as an air filtration system.

BACKGROUND

This section provides background information related to the present disclosure which is not necessarily prior art.

A wide variety of processes involve removing suspended solids from fluid streams. Typical examples include pretreatment systems for reverse osmosis desalination plants, waste water treatment plants and various food processing applications.

One filtration process is called Dissolved Air Flotation (DAF). The DAF process uses fluid saturated with air in a way that can remove most suspended solids from water streams. The DAF process, while effective, consumes large amounts of energy needed to pump water at high pressure to facilitate generation of water saturated with air. In addition, special tanks and controls are needed to regulate the process of dissolving air into the pressurized water stream. However, the DAF process described above may be adapted to use gasses other than air and fluids other than water. Thus, gas is used in place of water in the following description.

FIG. 1 illustrates a typical DAF system 10. The raw water stream enters the DAF system through a primary inlet pipe 12 and flows into an inlet end 13 of a flotation tank 14. A plume of microscopic air bubbles 16 rises through raw water 18 in flotation tank 14. The bubbles 16 stick to suspended solids such as tiny drops of oil, grease or algae cells and cause the particles to float to the surface forming a sludge layer 20. A moving conveyor skimmer 22 drags the floating sludge layer 20 to a hopper 24.

A coagulant may be added from a coagulant source 26 to the raw water stream in the primary inlet pipe 12 to promote agglomeration of particles to increase the effectiveness of the floatation process. Heavy materials 30 may settle to the bottom of flotation tank 14. The heavy materials 30 are collected by heavy material hopper 32. Relatively clean water may be discharged through a discharge outlet 34 at an outlet end 36 of the filtration tank 14.

A partition 40 near the outlet end 36 of the flotation tank 14 forms an area of relatively clean water near the outlet end 36 of the partition 40. A secondary outlet 44 draws water from the outlet end 36 of the partition 40 near the outlet end 36 and fluidically communicates the relatively clean water to pump 46. The pump 46 typically pressurizes the relatively clean water to 80 to 100 pounds per square inch gauge (psig). The pressurized relatively clean water enters an absorption tank 48 at a water inlet 50. The relatively clean (and pressure increased) water is exposed to pressurized air (at the same pressure as the water) within the absorption tank 48. The pressurized air is rapidly absorbed by the water to form a solution at or near the saturation point with air.

The solution exits absorption tank 48 by solution outlet pipe 52. The solution passes through a pressure reduction valve 54 into the solution inlet 56 of the filtration tank 14. The reduction in pressure within the pressure reduction valve 54 results in much of the dissolved air coming out of solution in the form microscopic bubbles, which are directed into flotation tank 14 forming a plume of rising bubbles 16.

Compressed air is supplied to absorption tank 48 by compressor 60 through flow regulating valve 62 and through an air inlet 64 of the absorption tank 48. A fluid level sensor 66 monitors water level in absorption tank 48 and sends a level signal to a controller 70. The controller 70 may communicate a control signal to air regulating valve 64 and/or pump 46 as necessary to maintain proper water level in tank. The pump 46 uses a lot of energy in the process.

SUMMARY

This section provides a general summary of the disclosure, and is not a comprehensive disclosure of its full scope or all of its features.

In one aspect of the disclosure, a system includes an absorption tank having a compressor communicating gas thereto, a suspended solid filtration tank having a primary inlet, a secondary inlet, a primary outlet and a secondary outlet and a pump comprising a pump inlet coupled to the secondary outlet and a pump outlet communicating fluid to the absorption tank. The absorption tank forms a solution from the fluid and gas. A turbine mechanically couples the pump with a common shaft extending to the pump. The turbine has a turbine inlet coupled to the absorption tank and a turbine outlet coupled to the secondary inlet. The turbine depressurizes the solution.

In another aspect of the disclosure, a method comprises communicating suspended solid fluid into a suspended solid filtration tank through a primary inlet, communicating reduced solid fluid from a secondary outlet of the suspended solid flotation tank to a pump inlet, pressurizing the reduced solid fluid, communicating reduced solid fluid from a pump outlet to an absorption tank, communicating compressed gas into the absorption tank, mixing the gas and reduced solid fluid to form a solution, communicating the solution to a turbine inlet, reducing the pressure of the solution in the turbine, communicating the solution from the turbine to the secondary inlet and skimming suspended solids from the suspended solid flotation tank using the gas from the solution.

In yet another aspect of the disclosure, a centrifugal pump includes a fluid inlet, a plurality of pumping stages having a common shaft. The plurality of pumping stages extends axially along said shaft. The pump further includes a fluid outlet and an inner housing enclosing the plurality of pumping stages. The centrifugal pump further includes an outer housing enclosing the inner housing and spaced apart from the inner housing to form an inter-shell clearance therebetween. The compressor communicates compressed gas into the inter-shell clearance. A first stage of the plurality of adjacent pumping stages comprises one or more first holes through the inner housing. The one or more first holes have a first total opening area so that compressed gas is introduced into the first stage. A second stage of the plurality of adjacent pumping stages is disposed toward the fluid outlet relative to the first stage. The second stage comprises one or more second holes through the inner housing so that compressed gas is introduced into the second stage.

In a further aspect of the disclosure, a method includes communicating reduced solid fluid from a suspended solid flotation tank to a multi-stage pump having an inter-shell clearance between an inner housing and an outer housing, communicating pressurized gas into the inter-shell clearance, communicating the pressurized gas from the inter-shell clearance into at least one of a plurality of stages of the multi-stage pump, dissolving the gas in the at least one of the plurality of stages to form a solution, communicating the solution to the flotation tank through a fluid outlet of the multi-stage pump and floating suspended solids using the solution.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

Corresponding reference numerals indicate corresponding parts throughout the several views of the drawings.

DETAILED DESCRIPTION

Figure 1:
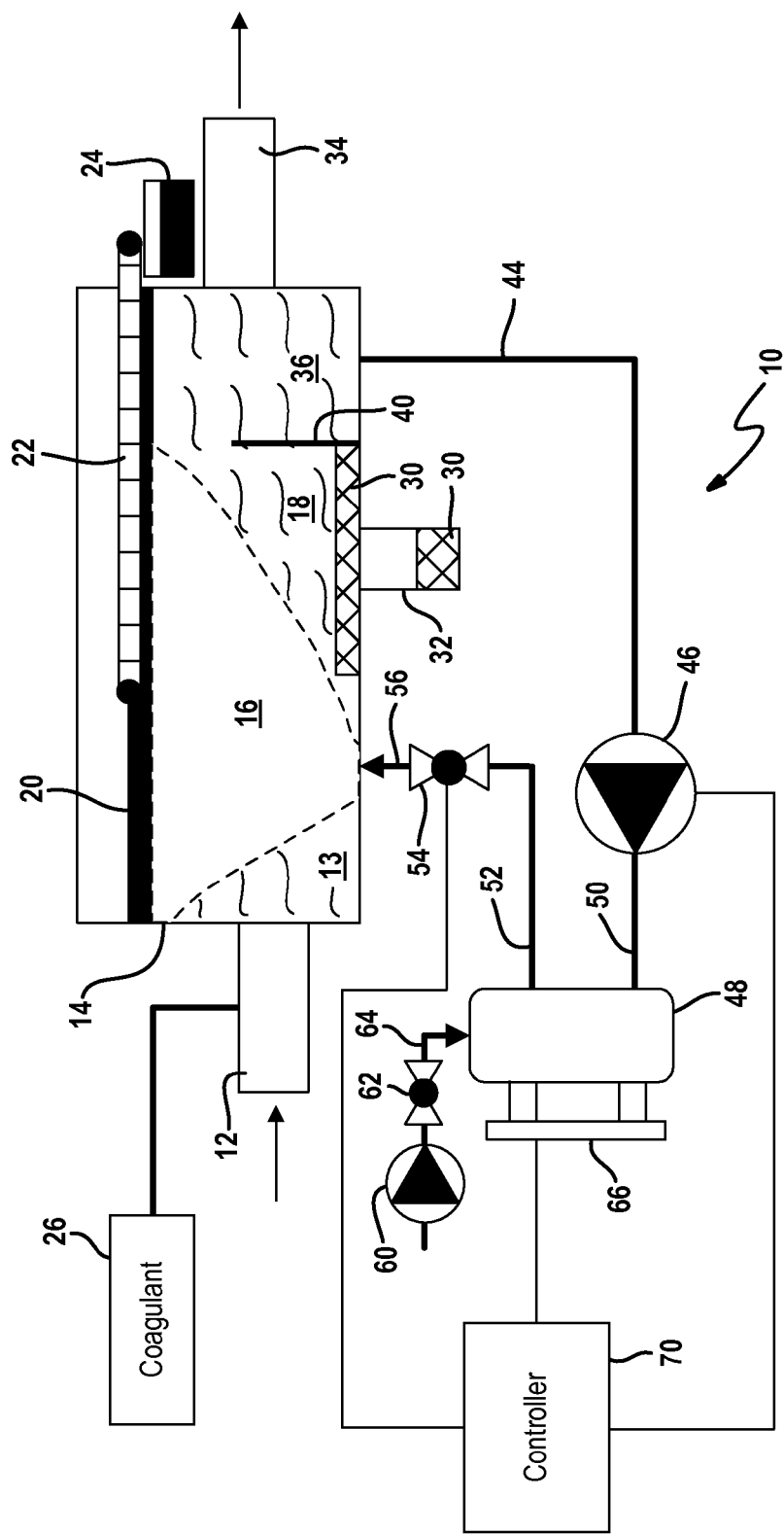
FIG. 1 is a schematic view of a first air flotation system according to the prior art.

Examples will now be described more fully with reference to the accompanying drawings.

The examples are provided so that this disclosure will be thorough, and will fully convey the scope to those who are skilled in the art. Numerous specific details are set forth such as examples of specific components, devices, and methods, to provide a thorough understanding of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The terminology used herein is for the purpose of describing particular examples only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the examples.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
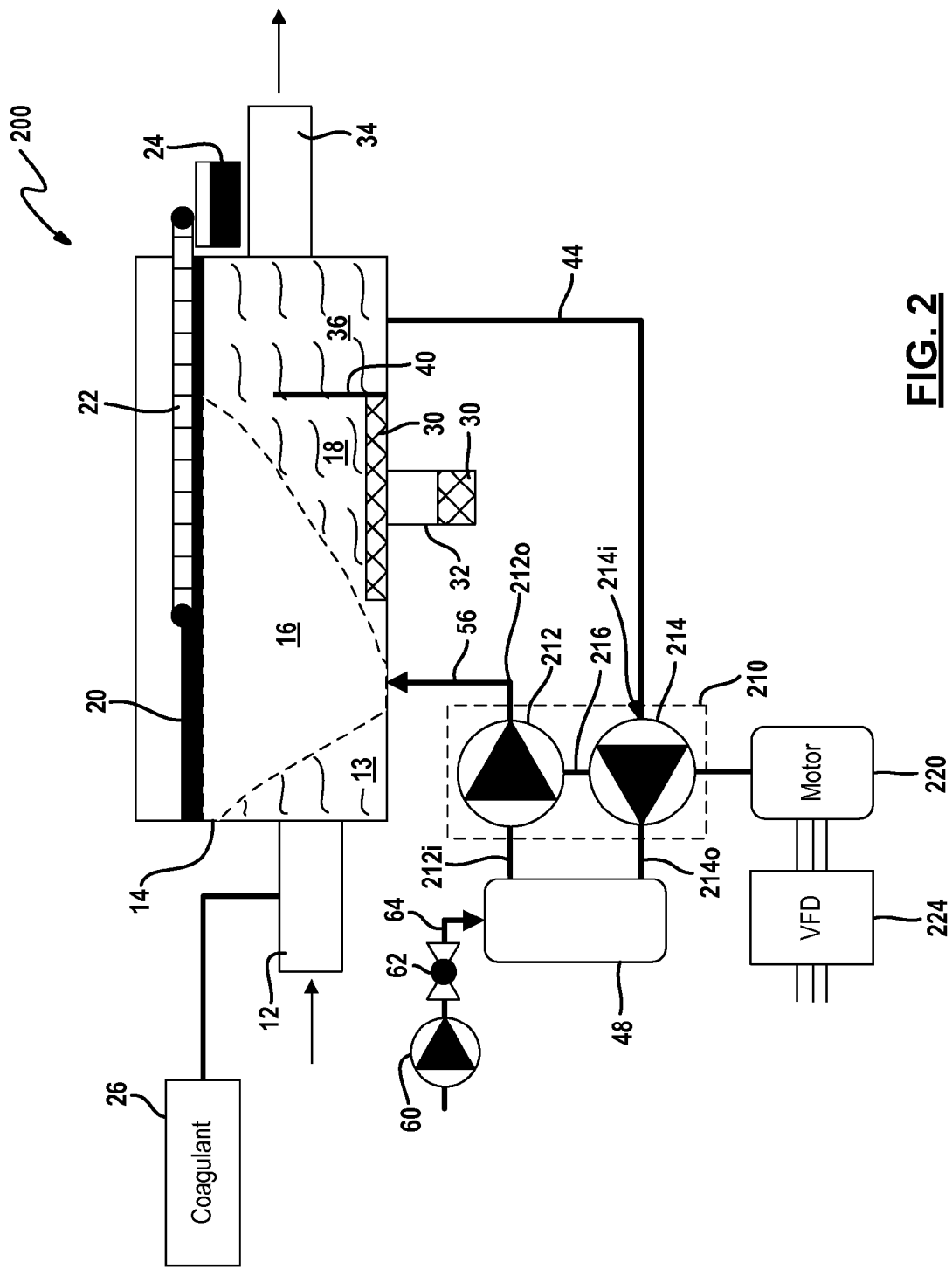
FIG. 2 is a schematic view of a first flotation system according to the present disclosure.

Referring now to FIG. 2, a system 200 according to the present disclosure includes many of the same components as set forth in FIG. 1. The DAF process described above may be adapted to use gasses other than air and fluids other than water. The word fluid is used throughout and refers to a liquid. Thus, gas is used in place of air and fluid in place of liquid water in the following description. The flotation tank 14 of the system 200 has different components in communication with the relatively clean fluid from the secondary outlet 44 and the secondary inlet 56.

In this example, an energy recovery device 210 has a turbine 212 and a pump 214 to reduce the overall amount of energy consumed by the system 200. The turbine 212 and the pump 214 have a common shaft 216 therebetween. The shaft 216 may be referred to as a common shaft. The shaft 216 extends to a motor 220. Rotation of the shaft 216 caused by the motor 220 may rotates the turbine 212 and the pump 214. The motor 220 is given by a variable frequency drive 224.

The pump 214 has an inlet 214$i$ coupled to secondary outlet 44 of the flotation tank 14 and an outlet 214$o$ coupled to the absorption tank 48. The turbine portion has an inlet 212$i$ couple to the absorption tank 48 and an outlet 212$o$ coupled to the secondary inlet 56 of the flotation tank 14.

In this example, the absorption tank 48, the compressor 60, the flow regulating valve 62 and the air inlet 64 of the absorption tank 48 are all common from FIG. 1. In this example, the depressurization of the saturated high pressure fluid in turbine 212 generates a torque on the shaft 216 and causes bubbles 16 to form. The torque on the shaft 216 reduces the net power required by the motor 220. More than 50 percent reduction in the amount of power required by the motor 220 may be obtained. In this example, the depressurization of the solution is in the turbine 212.

The variable frequency drive 224 may be used to control the flow rate. Because the shaft 216, the turbine 212 and the pump 214 rotate at the same speed, a hydraulic match is maintained between the turbine 212 and the pump 214.

Figure 3:
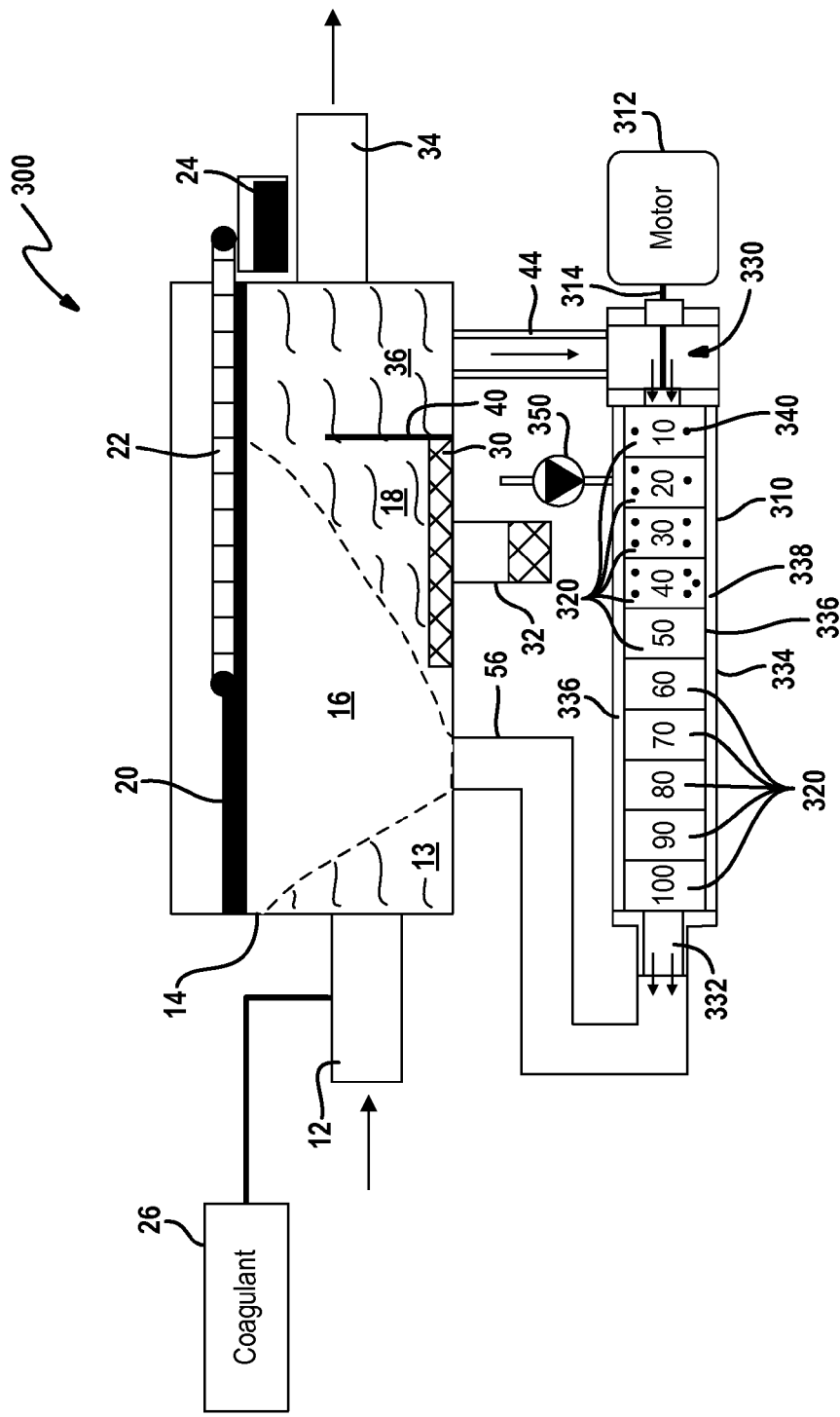
FIG. 3 is a schematic view of a second flotation system according to the present disclosure.

Referring now to FIG. 3, another example of a system 300 is illustrated. This example also uses the suspended solid flotation tank 14 in a similar manner to that set forth above in FIGS. 1 and 2. Therefore, the description will not be repeated. In this example, a multistage pump 310 is coupled between the secondary outlet 44 and the secondary inlet 56 of the suspended solid flotation tank 14. The multistage pump 310 is driven by a motor 312. That is attached to a shaft 314 that is common with each stage of the multistage pump 310. In this example, the pump 310 has ten pumping stages 320 each increasing the pressure by 10 PSI over the previous stage. The numbers in each stage represent the pressure for this example.

The pump 310 also includes a fluid inlet 330 and a fluid outlet 332. The pump 310 also includes an outer housing 334 and an inner housing 336. An annular gap that forms an inter-shell clearance 338 is disposed between the inner housing 336 and the outer housing 334. The annular gap may have gas such as air therein.

The first four stages of the multistage pump 310 may include passages or holes 340 therethrough. The number of holes 340 may vary. The number of holes 340 may increase along the axial direction of the pump 310. In this example, two holes 340 are in the first stage, three holes 340 are in the second stage, four holes 340 are in the third stage and five holes 340 are in the fourth stage. The number of holes 340 may vary as well as the size. The total area of the holes increases as the distance from the inlet end of the pump 310 increases. The fourth stage has a greater combined area of holes 340 than the third stage. The third stage has a greater hole area than the second stage. The second stage has a greater hole area than the first stage.

A compressor 350 provides pressurized gas to the annular gap 338. The gas pressure in the annularized gap that forms inter-shell clearance 338 is preferably higher than the fluid pressure within any of the stages with holes 340 therein.

Figure 4:
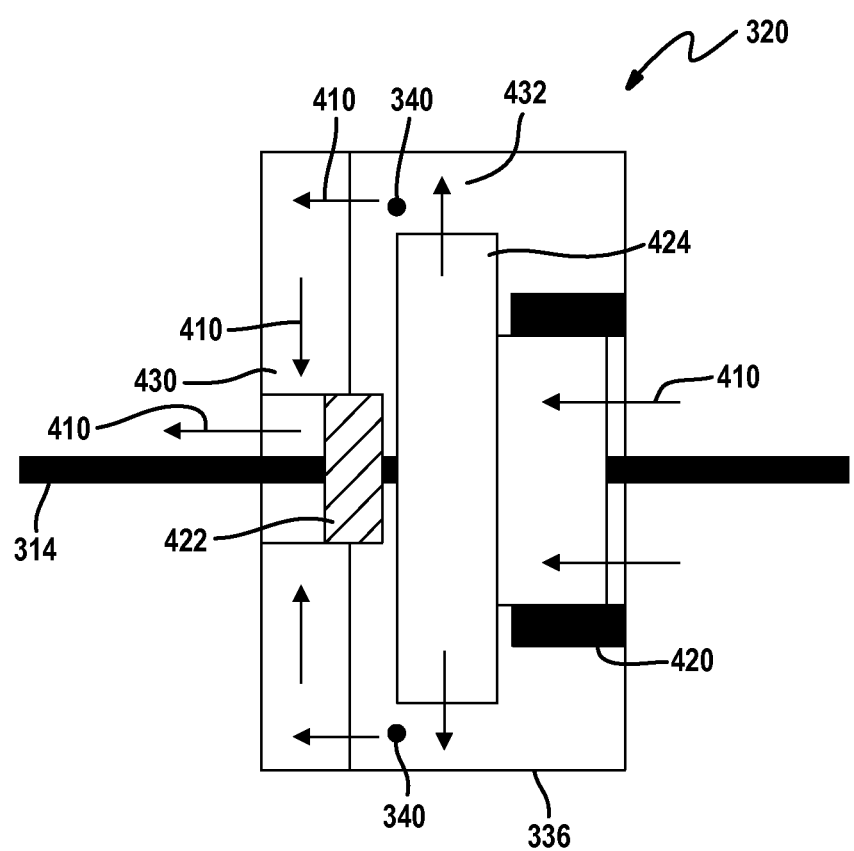
FIG. 4 is a schematic view of one stage of the multi-stage centrifugal pump of FIG. 3.

Referring now to FIGS. 3 and 4, an example of a stage 320 is set forth. In this example, the shaft 314 is a common shaft running between each of the stages and the motor 312. The shaft 314 defines an axial direction of the pump 310. The arrows 410 illustrate the direction of flow of the fluid through the stage 320. Each stage 320 includes where a wear ring 420 and a bearing/seal 422. The wear ring 420 reduces leakage at the discharge of the inlet of the impeller 424.

The stage 320 also includes a diffuser 430. The diffuser 430 accepts fluid from a discharge area 432 of the impeller 424 and directs the flow to the inlet of the impeller 424 for the following stage (which in this Figure is left). The diffuser 430 converts the high velocity fluid flow into a lower velocity flow while recovering static pressure.

Compressed gas supplied by the compressor 350 illustrated in FIG. 3 enters the stage 320 through the holes 340. The gas received through the holes 340 is entrained by the flowing fluid in the form of small bubbles and is absorbed due to the turbulence of the rotating impeller 424. The turbulence and increasing pressure in diffuser 430 and the following impeller 424 help to obtain dissolution of the air in the water.

The number and size of the holes 340 in each stage may be determined based upon the operating conditions of the multistage pump. The number or total area of the holes 340 in the first stage is less than the total area of the holes 340 in the subsequent stages. This prevents excessive gas from choking the flow of fluid because the gas will expand considerably when entering the relatively low pressure of the first few stages. Each stage 320, in this example, increases the pressure in the fluid by ten pounds per square inch. Higher pressure stages may have a larger number of holes or greater hole area because the gas will not expand as much. Only the first several (four) in this example have holes 340.

The holes 340 may also be concentrated on a lower portion (relative to gravity) of the inner housing 336. This will allow any fluid collecting in the inter-shell clearance 338 to be reabsorbed into the stages 320. It should also be noted that the required pressure from the compressor 350 may only be slightly larger than the pressure within the final stage 320 containing holes 340.

In operation of the system illustrated in FIGS. 3 and 4, relatively clean fluid from the secondary outlet 44 is received within the pump inlet 330. The motor 312 rotates and each stage of the multistage pump increases the pressure of the fluid therein. The holes 340 allow gas to be entrained into the fluid within the first few stages of the multistage pump. In this example, the multistage pump 310 has four stages with an increasing number of holes. The entrained gas forms a solution as is described in FIG. 1. When the solution enters the gas inlet 56 the resulting bubbles form within the flotation tank 14.

Figure 5:
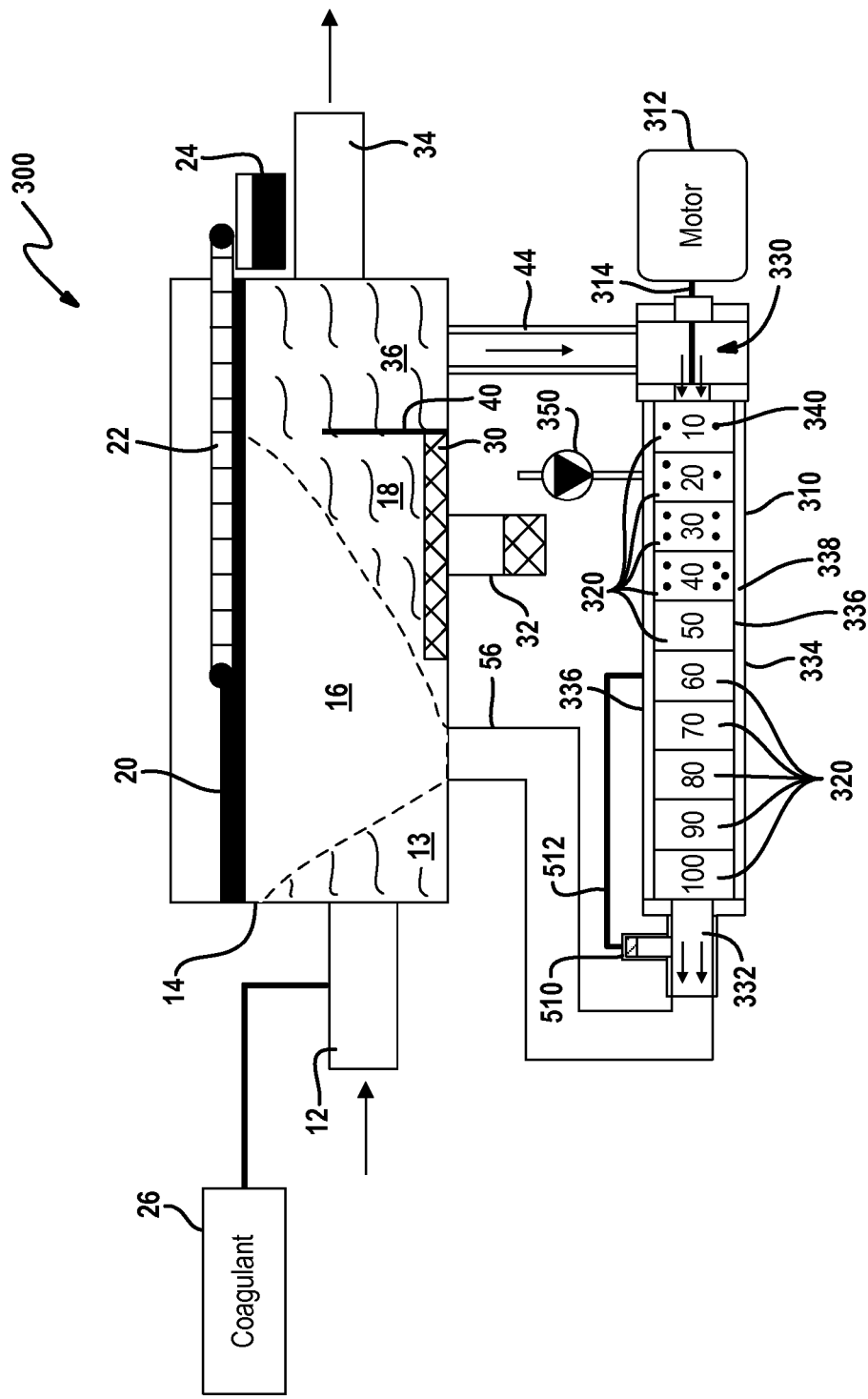
FIG. 5 is a schematic view of a third flotation system according to the present disclosure.

Referring now to FIG. 5, a similar example to that of FIG. 3 is set forth. However, in this example a gas trap 510 captures any bubbles that were not fully absorbed into the fluid at the last stage adjacent to the outlet 332 of the multistage pump 310. Undissolved gas collects within the gas trap 510. A pipe 512 in communication with the gas trap 510 and the inter-shell clearance 338 communicates the gas trapped within the gas trap 510 to the inter-shell clearance. It should be noted that the pressure within the gas trap 510 equals the discharge pressure from the final stage of the multistage pump. The inter-shell pressure is much lower and this flow of gas from the gas trap 510 to the inter-shell clearance 338 is achieved.

The above examples reduce the amount of energy consumption used during the pressurization and depressurization process of the gas absorption by recovering hydraulic energy during the depressurization process. The multi-stage pump dissolves large amounts of gas without choking any single impeller and reduces the need for an absorption tank and the associated controls. By locating holes 340 near the bottom of each stage, the fluid is forced back into the stages.

Figure 6:
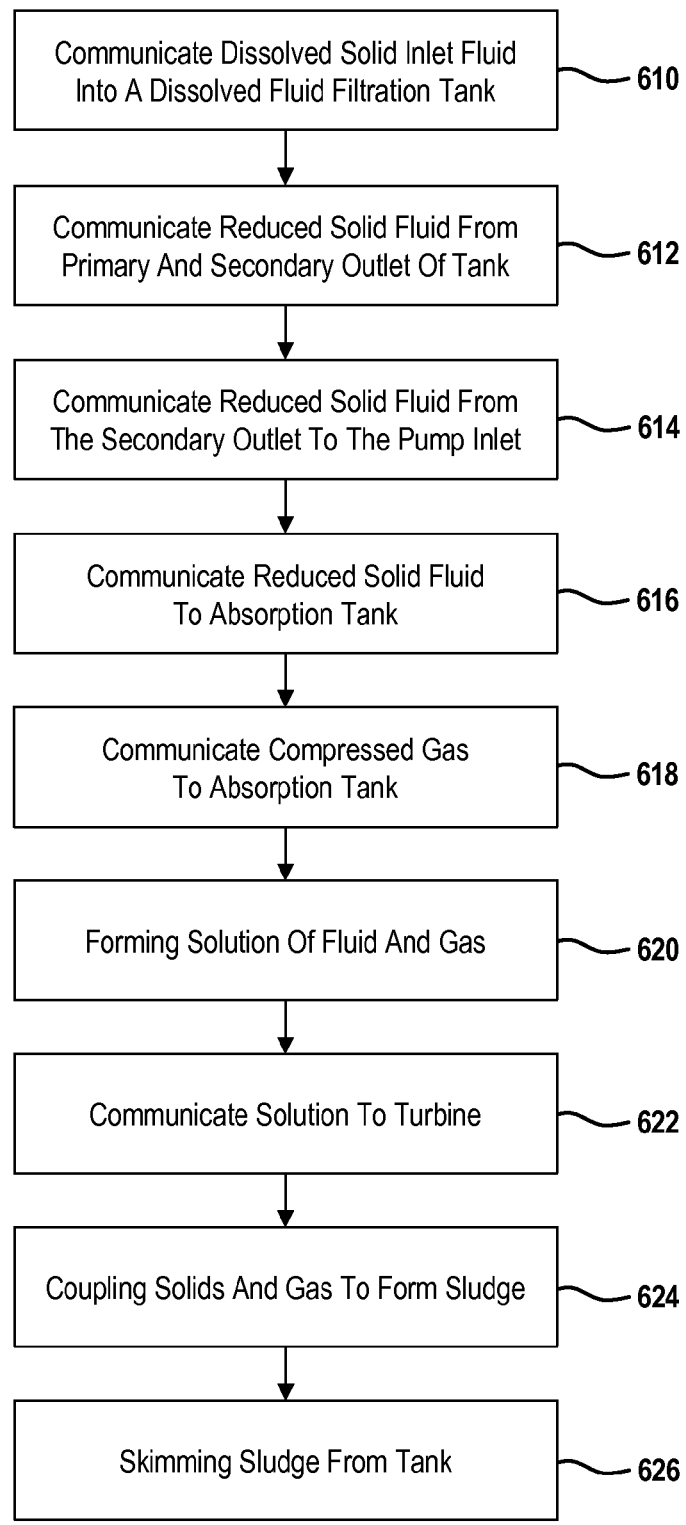
FIG. 6 is a flow chart of a method for operating the flotation system of FIG. 2.

Referring now for FIG. 6, a method for operating the system illustrated in FIG. 2 is set forth. In step 610 suspended solid inlet fluid is communicated into the fluid filtration tank 14. In step 612 reduced solid fluid is communicated from the primary outlet of the tank and the secondary outlet of the tank. In step 614 the reduced solid fluid is communicated from the secondary outlet to the pump inlet. The pressure is increased in the pump and the reduced solid fluid is communicated from the pump outlet to the absorption tank in step 616. In step 618 compressed gas is communicated to the absorption tank. A solution of gas and fluid is formed in step 620 within the absorption tank. In step 622 the solution is communicated to a turbine to release the gas absorbed within the fluid. In step 624 the solids within the tank are coupled to the gas to form sludge. In step 626 the sludge is skimmed from the tank. Heavy materials such as metals may be removed through a trap in the lower part of the tank.

Figure 7:
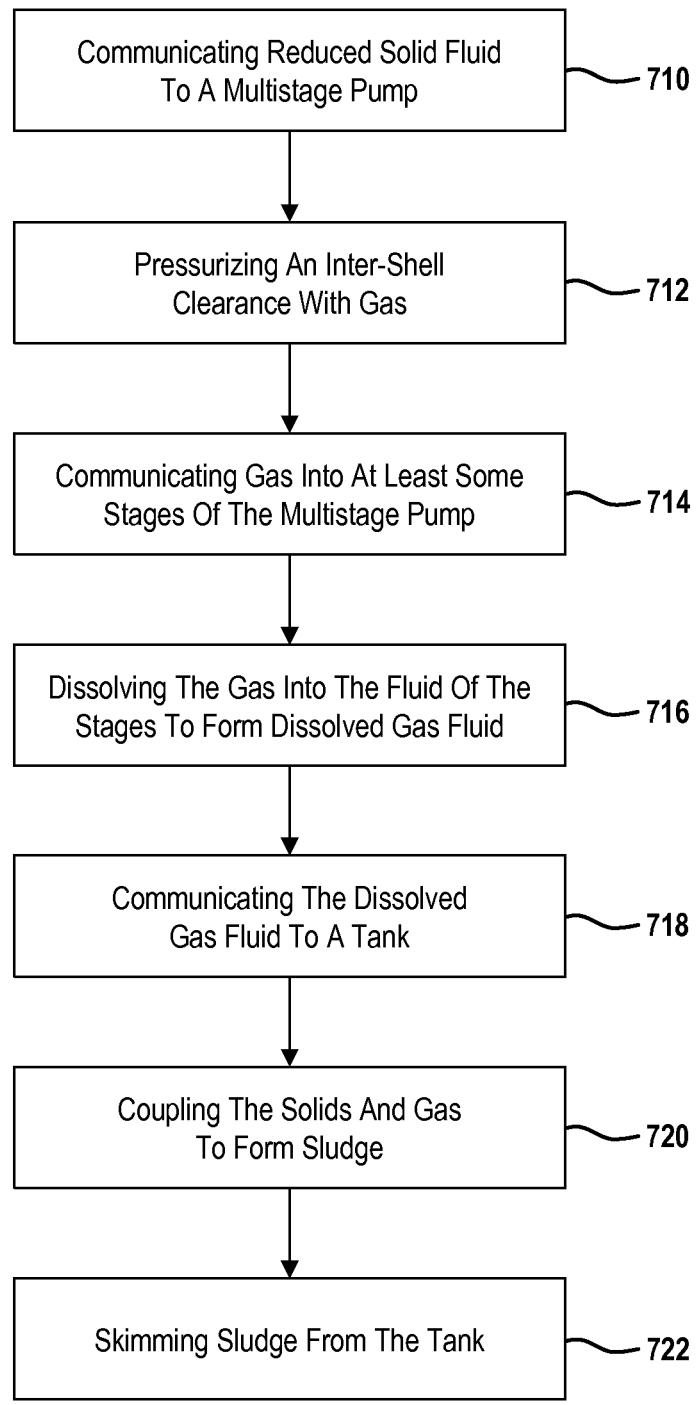
FIG. 7 is a flow chart of a method for operating the flotation system of FIG. 3.

Referring now to FIG. 7, a method for operating the examples set forth in FIGS. 3 and 5 is set forth. In step 710, each reduced solid fluid is communicated to the inlet of a multi-stage pump from a secondary outlet of the filtration tank. In step 712 the inter-shell clearance is pressurized with a gas such as air. Pressurized gas may be from a compressor, a gas trap or a combination of the two. In step 714 gas is communicated to at least some of the stages of the pump through the holes in the inner housing. In step 716 the multistage pump dissolves the gas into the fluid of the stages to form dissolved gas fluid. In step 718 the fluid with the dissolved gas is communicated to the tank.

In step 720 the solids within the tank are coupled to the gas to form sludge. The sludge floats to the surface and step 722 skims the sludge from the tank. Heavy materials such as metals may be removed through a trap in the lower part of the tank.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A centrifugal pump in communication with a compressor comprising:
   a fluid inlet;
   a plurality of pumping stages having a common shaft, said plurality of pumping stages extending axially along said shaft;
   a fluid outlet;
   an inner housing enclosing the plurality of pumping stages;
   an outer housing enclosing the inner housing and spaced apart from the inner housing to form an inter-shell clearance therebetween, said compressor communicating compressed gas into the inter-shell clearance;
   a first stage of the plurality of adjacent pumping stages comprising one or more first holes through the inner housing, said one or more first holes have a first total opening area so that compressed gas is introduced into the first stage; and
   a second stage of the plurality of adjacent pumping stages disposed toward the fluid outlet relative to the first stage, said second stage comprising one or more second holes through the inner housing so that compressed gas is introduced into the second stage, wherein the one or more second holes have a second total opening area greater than the first total opening area.

2. The centrifugal pump as recited in claim 1 further comprising a third stage of the plurality of pumping stages comprising one or more third holes through the inner housing, said one or more third holes have a third total opening area greater than the first total opening area and the second total opening area.

3. The centrifugal pump as recited in claim 2 further comprising a fourth stage of the plurality of pumping stages comprising one or more fourth holes through the inner housing, said one or more fourth holes have a fourth total opening area greater than the first total opening area, the second total opening area and the third total opening area.

4. The centrifugal pump as recited in claim 1 wherein each of the plurality of adjacent pumping stages comprises an impeller disposed on the common shaft, and further comprising a motor coupled to the common shaft.

5. The centrifugal pump as recited in claim 1 wherein each of the plurality of pumping stages receives input fluid axially adjacent to the common shaft.

6. The centrifugal pump as recited in claim 1 wherein the one or more first holes are disposed through a lower portion of the inner housing.

7. The centrifugal pump as recited in claim 1 further comprising a gas trap coupled to the fluid outlet for capturing undissolved gas, wherein the gas trap is fluidically coupled to the inter-shell clearance.

8. A system comprising:
   a suspended solid flotation tank has a primary inlet, a secondary inlet, a primary outlet and a secondary outlet; and
   the centrifugal pump as recited in claim 1 wherein the fluid inlet is in communication with the secondary outlet and the fluid outlet is in fluid communication with the secondary inlet.

9. The system as recited in claim 8 further comprising the compressor.

10. A method comprising:
    communicating reduced solid fluid from a suspended solid flotation tank to a multi-stage pump having an inter-shell clearance between an inner housing and an outer housing;
    communicating pressurized gas into the inter-shell clearance;
    communicating the pressurized gas from the inter-shell clearance into at least a first stage and a second stage of the multi-stage pump wherein the first stage has first holes in the inner housing having a first area less than a second area of second holes in the second stage;
    dissolving the gas in the at least one of the plurality of stages to form a solution;
    communicating the solution to the flotation tank through a fluid outlet of the multi-stage pump; and
    floating suspended solids using the solution.

11. The method as recited in claim 10 wherein communicating the pressurized gas from the inter-shell clearance into at least one of a plurality of stages of the multi-stage pump comprises communicating the pressurized gas from the inter-shell clearance into at least one of the plurality of stages of the multi-stage pump through one or more holes at least some of which are located through and near a bottom of the inner housing.

12. The method as recited in claim 10 wherein communicating pressurized gas into the inter-shell clearance comprises communicating pressurized gas into the inter-shell clearance from a compressor.

13. The method as recited in claim 10 wherein communicating pressurized gas into the inter-shell clearance comprises communicating pressurized gas into the inter-shell clearance from a gas trap of the fluid outlet of the multi-stage pump.

* * * * *